United States Patent [19]

Robert

[11] Patent Number: 5,225,218
[45] Date of Patent: Jul. 6, 1993

[54] METHOD OF MAKING CHEESE WITH MILK OBTAINED FROM ANIMALS FED WITH A FEED SUPPLEMENTED WITH AN AMINO ACID

[75] Inventor: Jean-Claude Robert, Neris Les Bains, France

[73] Assignee: Rhone-Poulenc Nutrition Animale, Commentry, France

[21] Appl. No.: 942,027

[22] Filed: Sep. 8, 1992

Related U.S. Application Data

[63] Continuation of Ser. No. 594,140, Oct. 10, 1990, abandoned.

[30] Foreign Application Priority Data

Oct. 10, 1989 [FR] France ............................... 89 13184

[51] Int. Cl.$^5$ ................................................ A23K 1/00
[52] U.S. Cl. .......................................... 426/2; 426/36; 426/310; 426/601; 426/807; 424/438; 424/497
[58] Field of Search ................... 426/36, 2, 656, 623, 426/630, 807, 310, 601; 424/438, 482, 497

[56] References Cited

U.S. PATENT DOCUMENTS

| | | | |
|---|---|---|---|
| 4,177,255 | 12/1979 | Dannelly | 424/482 |
| 4,181,710 | 1/1980 | Dannelly et al. | 424/482 |
| 4,675,175 | 6/1987 | Autant et al. | 424/497 |
| 4,832,967 | 5/1989 | Autant et al. | 426/807 |
| 4,876,097 | 10/1989 | Autant et al. | 426/807 |
| 4,877,621 | 10/1989 | Ardaillon et al. | 424/438 |
| 4,983,403 | 1/1991 | Ardaillon et al. | 426/2 |

OTHER PUBLICATIONS

Castagnetti et al., Dairy Science and Technology, 39(4), 1988, 280–299.
Campbell et al., The Science of Providing Milk for Man, 1975, 172–191.
Miller, Dairy Cattle Feeding and Nutrition, 1979, 52–61.
Thomas et al., "The Influence of Nutrient Balance on Milk Yield and Composition," Nutrition and Lactation in the Dairy Cow, 1988, 97–118.
Wiley et al., "The Influence of Timing and the Addition of Urea to Supplements Containing DL-Methionine on Ruminal Fermentation and Cow Weight Change in Beef Cows," J. Anim. Sci., 1991, 69:4617–4627.

*Primary Examiner*—R. B. Penland
*Attorney, Agent, or Firm*—Finnegan, Henderson, Farabow, Garrett & Dunner

[57] ABSTRACT

A method of making cheese with milk obtained from animals which have received feed supplemented or complemented with an amino acid in a protected form. The amino acid is preferably lysine and/or methionine.

8 Claims, No Drawings

METHOD OF MAKING CHEESE WITH MILK OBTAINED FROM ANIMALS FED WITH A FEED SUPPLEMENTED WITH AN AMINO ACID

This is a continuation of application Ser. No. 07/594,140, filed Oct. 10, 1990 now abandoned.

The present invention relates to particular uses of milk from animals which have received feed supplemented or complemented with a protected amino acid. One particular use concerns the preparation of cheese. Thus, the present invention provides a method for making cheese from milk obtained from animals which have received a feed supplemented or complemented by an amino acid in a protected form.

It is known in U.S. Pat. No. 4,181,710 to Dannelly et al. (Dannelly '710) to supplement the feed of ruminants by adding to their basic feed a supplement based on one or more essential amino acids, which are principally lysine and methionine. Indispensable amino acids, such as lysine and methionine, also known as limiting amino acids, are not synthesized in sufficient quantity by the body from the food absorbed daily by the animal. The fermentation of foodstuffs in the rumen by digestive enzymes causes the formation of proteins known as "microbial" proteins because they result from the action of the microbes situated in the rumen. These proteins, as well as those which have passed through the rumen, are digested in the intestine of ruminants and provide the necessary amino acids in the quality and quantity necessary for the maintenance of the ruminants and the production of milk. During lactation, the mammary gland absorbs the greatest part (80 to 90%) of the natural resources of amino acids, and requires a supplement of limiting amino acids.

Increasing milk production by adding, to the conventional feed of ruminants, supplements based on tanned proteins or protected amino acids has been tried.

The addition of a protected amino acid in accordance with the present invention, e.g. of lysine and/or of methionine, allows an increase in the level of proteins in the animal's milk.

It has been discovered, in a completely surprising manner, that the milk from animals which have received a supplement of a protected amino acid, preferably lysine and/or methionine, has unexpected cheese-making capabilities.

In fact, milk so produced allows an appreciable increase in yield of the quantity of curd produced per liter of milk compared with a cow which has received no supplement. In addition, the cheese can have increased solidity.

The feeding of a protected amino acid can be carried out using a core or nucleus containing an amino acid protected by a polymer which is resistant to the pH conditions of the rumen and which is liberated in the abomasum and/or the intestine of the ruminant.

In addition to at least one amino acid, the core can also contain a binder. Preferably, the binder is (1) a hydrophobic substance having a melting point greater than 60° C. and (2) a basic amino copolymer.

The polymer which protects the amino acids prevents degradation of the amino acids while passing through the sac of the rumen yet liberates the amino acids in a sufficiently rapid manner in the abomasum and the intestines to allow the amino acids to exert their beneficial effect.

The polymer used to protect the amino acid can be chosen from a mixture of a basic amino copolymer with a hydrophobic substance, the melting point of which is greater than 60° C., and/or a second copolymer insoluble in water (this second copolymer differs from the basic amino copolymer). In other words, the amino acid is protected by a layer comprising a mixture of a basic amino copolymer with a (1) hydrophobic substance having a melting point greater than 60° C. or (2) a second copolymer insoluble in water, or (3) a combination of a hydrophobic substance having a melting point greater than 60° C. and a second copolymer insoluble in water.

The basic amino copolymer is preferably a copolymer based on styrene and vinylpyridine.

The hydrophobic substance is preferably chosen from the fatty acids, the fatty esters, the fatty alcohols, the paraffins or the natural or synthetic waxes. The hydrophobic substance having a melting point greater than 60° C. is preferably pure stearic acid, rather than technical grade stearic acid.

The second copolymer insoluble in water is preferably chosen from the cellulose ethers or esters such as ethylcellulose or cellulose acetobutyrate, and the polyvinyl esters such a polyvinyl acetate. The second copolymer insoluble in water is most preferably ethylcellulose.

The use of compositions containing about 85% by weight of amino acid and about 15% by weight of coating is preferred.

The coating preferably contains 10 to 30% of a basic amino copolymer, from 70 to 90% of at least one substance selected from a hydrophobic substance and a polymer insoluble in water, the polymer insoluble in water being different from the basic amino copolymer.

The polymer which protects the amino acid can also be a zein-based copolymer, which is mixed with (1) a hydrophobic substance the melting point of which is greater than 60° C. or (2) a second copolymer insoluble in water (different from the zein-based copolymer), or (3) a combination of the hydrophobic substance the melting point of which is greater than 60° C. and the second copolymer insoluble in water. In this embodiment, the preferred hydrophobic substance and the preferred copolymer insoluble in water are the same as those described above.

The use of a composition containing 30° to 80° of zein, 0 to 70% of a polymer insoluble in water, the polymer insoluble in water being different from zein, and 10 to 70% of a hydrophobic substance is particularly preferred.

One preferred polymer which protects the amino acid is a styrene vinylpyridine copolymer in a mixture with a hydrophobic substance which is stearic acid and a copolymer insoluble in water which is ethylcellulose.

If desired, a plasticizing agent can be added to these compositions. The preferable plasticizing agent is chosen from triacetine, propylene glycol, butyl phthalate and sodium oleate.

Also, an inorganic filler such as talc can be added to these compositions.

Protected amino acids that can be used in the present invention are described, for example, in European Patent 188,953 (related to U.S. Pat. No. 4,876,097), French Patents 2,401,621 (related to U.S. Pat. No. 4,177,255) and 2,514,261 (related to U.S. Pat. No. 4,675,175), European Patent 260,186 (related to U.S. Pat. No. 4,877,621) and French Patents 2,606,597 (related to U.S. Pat. No.

4,832,967) and 2,582,909 (related to Australian Patent No. 86-58381), the disclosures of all of the above being specifically incorporated by reference herein.

The protected amino acids are preferably included in the daily feed of the animals at a rate of from 0 to 30 grams of methionine and 0 to 100 grams of lysine, the minimum figure for the sum of the two amino acids, preferably being at least 5 grams per day.

The present invention will be more completely described with the aid of the following example which should in no manner be considered as limiting the invention.

EXAMPLE

The experimental animals were heifers of 8 to 12 weeks' lactation, the milk production level of which was from 22.5 to 30.5 kg.

The basic diet consisted of maize silage ad libitum. It was supplemented by an energy-containing concentrate, a nitrogen-containing concentrate (gluten meal) and/or by a "protected amino acid" concentrate (treatment) or a control concentrate (neither amino acid nor protected product). The concentrations were fed in quantities which were identical for all the heifers and constant throughout the experiment (20 grams of methionine base and 48 grams of lysine base).

These amino acids were fed in the form of a mixture of coated methionine and of coated methionine/lysine granules having the following compositions:

| Methionine/lysine granules: | |
|---|---|
| 84 g of nucleus containing | 59.5% lysine HCl |
| | 14.5% methionine |
| | 12% talc (filler) |
| | 14% binder |
| | (95% stearic acid, 5% 2-vinylpyridylstyrene copolymer (65/35)) |
| 16 g of coating containing | 30% 2-vinylpyridylstyrene 65/35 |
| | 10% stearic acid |
| | 60% talc (filler) |
| Methionine granules containing: | |
| 89 g of nucleus containing | 77.5% methionine |
| | 10% talc (filler) |
| | 12.5% binder containing 95% stearic acid and 5% 2-vinylpyridylstyrene copolymer (65/35) |
| 11 g of coating containing | 30% 2-vinylpyridylstyrene 65/35 |
| | 10% stearic acid |
| | 60% talc (filler) |

The experiment lasted 16 weeks and was divided into 4 periods of 4 weeks each.

On Tuesday of the last week of each period, samples of about 1 liter per cow were taken up at the morning milking. A mean sample (500 ml per cow) was made up in each period for the 4 cows receiving the same treatment. Sodium penicillin G (200 IU per liter) was added to this milk, which was skimmed for technological tests.

The technological parameters were measured on the skimmed milk during its coagulation at 35° C. by the action of rennet (5.2 mg of chymosin per liter) used at a rate of 0.13 mg of chymosin per liter of milk. These measurements were carried out on milk the pH of which was standardized at 6.6 (by the addition of lactic acid) and the mineral balance of which had been reestablished.

The readiness to coagulate was measured using a Formagraph (Foss Electric) and is represented by the incubation time, the time to firming and the consistency of the curd 30 minutes after the addition of rennet. It was measured on milk at the initial pH and at the predetermined pH.

The fresh, dry and nitrogen "cheese yields" were determined one hour after adding rennet, by running of the whey, immediately followed by centrifugation.

The results of the above experiments are shown in the following tables. Each table provides results obtained using a different feed material. Table 1 shows an increase in cheese firmness when the protected amino acid is utilized. Table 2 shows that a cheese with increased firmness or hardness results from milk obtained from animals which have received protein-rich, but lysine-poor, feed supplemented with one of applicant's protected amino acids.

| THE EFFECT OF LYSINE/METHIONINE SUPPLEMENTS ON THE CHEESE-MAKING POTENTIAL OF MILK | | |
|---|---|---|
| | WITHOUT AMINO ACIDS | WITH AMINO ACIDS |
| Cheese yields (%) | | |
| fresh | 18.4 | 19.3 |
| nitrogen | 78.2 | 79.1 |
| dry matter | 43.7 | 44.6 |
| FORMAGRAPH | | |
| at initial pH | | |
| incubation time (min) | 15.0 | 15.5 |
| time to firming (min) | 6.8 | 6.8 |
| firmness of the curd (mm) | 37.5 | 37.7 |
| coagulation speed: incubation time/time to firming | 2.3 | 2.3 |
| at standardized pH | | |
| incubation time (min) | 13.8 | 14.5 |
| time to firming (min) | 6.1 | 6.3 |
| firmness of the curd (mm) | 39.3 | 40.1 |
| coagulation speed: incubation time/time to firming | 2.3 | 2.3 |

| THE EFFECT OF LYSINE/METHIONINE SUPPLEMENT + NATURE OF THE NITROGEN (MAIZE GLUTEN COMPLEMENT CONTAINING 60% PROTEIN) ON THE CHEESE-MAKING POTENTIAL OF MILK | | |
|---|---|---|
| | WITHOUT AMINO ACIDS | WITH AMINO ACIDS |
| Cheese yields (%) | | |
| fresh | 17.9 | 19 |
| nitrogen | 77.8 | 79 |
| dry matter | 42.6 | 45.1 |
| FORMAGRAPH | | |
| at imitial pH | | |
| incubation time (min) | 15.3 | 14.8 |
| time to firming (min) | 7.1 | 6.8 |
| firmness of the curd (mm) | 36.4 | 38.2 |
| at standardized pH | | |
| incubation time (min) | 13.8 | 14.4 |
| time to firming (min) | 6.4 | 6.6 |
| firmness of the curd (mm) | 38.7 | 39.2 |

What is claimed is:

1. A method of making cheese, comprising making cheese with milk from at least one cow which has been fed a diet including a protected amino acid supplement, wherein said protected amino acid supplement comprises a core containing at least one amino acid selected from the group consisting of methionine and lysine, and a protective layer around the core which is substantially resistant to degradation in the rumen of a cow and liberates said at least one amino acid in the abomasum, in the intestine, or in both the abomasum and intestine of the cow, wherein the protective layer is a polymer comprising a mixture of a basic amino polymer and (i) a hydrophobic substance having a melting point greater than 60° C., or (ii) a non-water-soluble copolymer, or (iii) a combination of a hydrophobic substance having a melting point greater than 60° C. and a non-water-soluble copolymer, and wherein said protected amino acid supplement is fed to each cow so that the diet includes at least 5 grams per day of said at least one amino acid.

2. A method of making cheese as recited in claim 1, wherein the core contains methionine and lysine.

3. A method of making cheese as recited in claim 1, wherein the basic amino polymer is a copolymer based on styrene and vinylpyridine, the hydrophobic substance is stearic acid, and the non-water-soluble copolymer is ethylcellulose.

4. A method of making cheese as recited in claim 1, wherein the core further contains a binder.

5. A method of making cheese as recited in claim 4, wherein the binder comprises a hydrophobic substance having a melting point greater than 60° C. and a basic amino polymer.

6. A method of making cheese as recited in claim 5, wherein the core contains methionine and lysine.

7. A method of making cheese as recited in claim 4, wherein the binder comprises stearic acid and a copolymer based on styrene and vinylpyridine.

8. A method of making cheese as recited in claim 1, wherein said basic amino polymer is zein.

* * * * *